Figure 1:
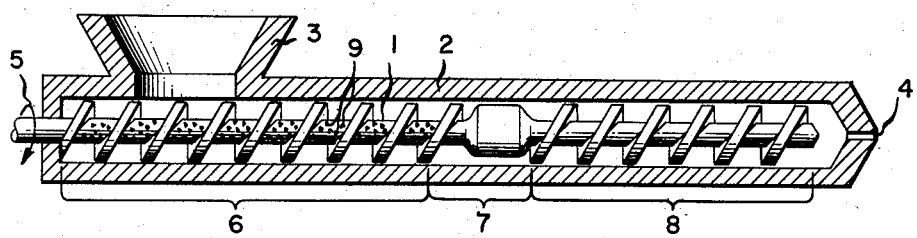

June 17, 1958  S. H. MUNGER ET AL  2,838,794
EXTRUSION APPARATUS
Filed April 8, 1957

INVENTORS
STANLEY HIRAM MUNGER
HENRY SMITHIES
HAROLD BARNARD WHITFIELD, JR.

BY *Earl L. Tyner, Jr.*
ATTORNEY

United States Patent Office 2,838,794
Patented June 17, 1958

2,838,794

EXTRUSION APPARATUS

Stanley Hiram Munger, Rumson, N. J., and Henry Smithies and Harold Barnard Whitfield, Jr., Parkersburg, W. Va., assignors to E. I. du Pont de Nemours and Company, Wilmington, Del., a corporation of Delaware Application April 8, 1957, Serial No. 651,348

3 Claims. (Cl. 18—12)

This invention relates to an extrusion apparatus, and, more particularly, it relates to an extruder screw in which the root of the screw is studded.

Most plastic materials which are subjected to the working of a screw are thermoplastic, and the heat developed by the action of the extrusion screw causes the thermoplastic material to melt into the form of a viscous, sticky mass. In such a procedure the extrusion screw, which is normally made of metal, easily adheres to the melted plastic, and thereby is capable of working and transporting the plastic. There are occasions in the plastic industry when it is preferred to manufacture plastic materials in the form of an aqueous dispersion of plastic particles, which may, in a subsequent step, be subjected to an extrusion operation. If an aqueous dispersion of plastic particles is fed into an ordinary screw extruder, the aqueous medium acts as a lubricant and prevents the particles from sticking to the metallic surface of the extruder screw or the barrel. As a consequence, the rotating extrusion screw fails to perform any working action upon the plastic particles because the aqueous dispersion slips over the smooth surfaces of the rotating screw and remains unaffected by reason of the negligible forces of friction between the metal and the liquid dispersion.

It is an object of this invention to provide an extrusion device which is capable of transforming a mixture of polymeric thermoplastic particles and a low viscosity liquid, which has substantially no solvent power with respect to the plastic, into a compact mass of molten plastic containing substantially none of the liquid. It is another object of this invention to provide an extrusion screw which is capable of wringing water out of an aqueous dispersion of polymeric particles. It is a specific object of this invention to provide an extrusion device for receiving, as a feed material, an aqueous dispersion of plasticized polyvinyl butyral particles and for delivering molten, plasticized polyvinyl butyral containing less than 3% by weight of water. Other objects will be revealed in the more detailed description of this invention given below.

The above objects are accomplished by providing an extrusion screw in which the exposed root surfaces of the screw are roughened by the presence of a multiplicity of small projections, each of which has an upper surface spaced upwardly and outwardly from the root surface of the screw and at least one side wall joining the upper surface of the projection to the root surface of the screw. In the preferred embodiment of this invention the upper surface of the projection is rectangular in shape, and parallel with the root surface of the screw. The height of the projections is preferably about 0.03 inch to 20% of the depth of the screw thread. The total area of the upper surfaces of all projections is preferably about one-fifth to one-third of the root surface area between projections.

Figure 2:
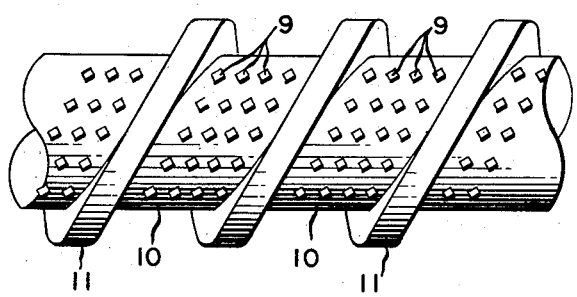
Figure 3:
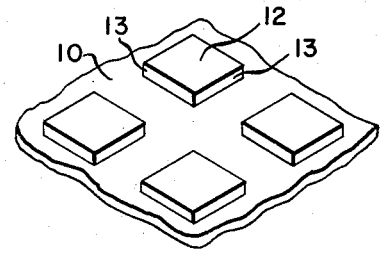
Figure 4:
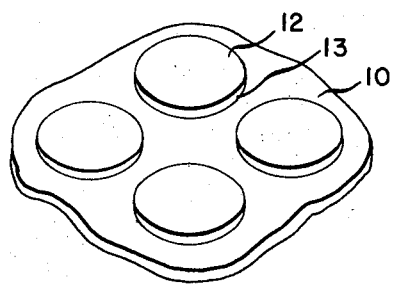
Figure 5:
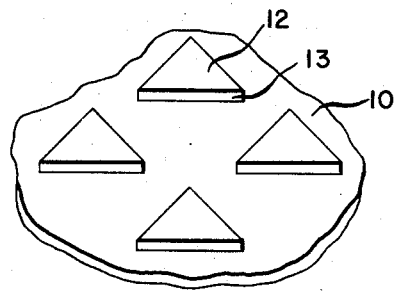

In the attached drawings, Figure 1 is a schematic illustration of a screw extrusion device incorporating this invention in the feed section or, as it is sometimes called, the transport section of the screw. Figure 2 is a fragmentary view of the screw having projections in the root surface of the screw. Figures 3, 4, and 5 are enlarged fragmentary illustrations of various types of projections, e. g., quadrangles, circles, and triangles.

With specific reference to Figure 1, it may be seen that this invention is particularly suitable in an ordinary screw extrusion device comprising a screw, indicated generally by 1, encased in barrel 2, which, in turn, is provided with a feed hopper 3, and a die 4. The screw 1 is rotated in the direction shown by arrow 5 by a suitable motor and speed reducer, not shown here, or by other well-known means for supplying rotary motion to the screw. In certain embodiments of this invention, screw 1 may be divided into three sections, namely, the feed section (or transport section) 6, the metering section 7, and the extrusion section 8. As an alternative embodiment, there may be an extraction section, normally located between the metering section and the extrusion section, in which the plastic material in the extruder is subjected to a vacuum in order to remove undesirable vapors. The root surface of the feed section 6 is shown to be covered with a multiplicity of projections, generally indicated by 9, while the metering section 7 and the root surface of the extrusion section 8 are shown as smooth surfaces.

Figures 2, 3, 4, and 5 are enlarged views of screw 1 and projections 9 which have been described generally with reference to Figure 1. In Figure 2 it may be seen that the fragmentary portion of the screw consists of a root surface 10, one or more threads 11 and a multiplicity of projections 9. The projections 9 lie entirely on the generally cylindrical root surface 10 and not on any of the surface of thread 11. Figure 3 illustrates the preferred quadrangular shape of projections 9. Included within the quadrangular shape are, of course, squares, oblongs, and diamonds. Figure 4 illustrates an alternative in which the projections are circular, and Figure 5 illustrates an alternative in which the projections are triangular. It is, of course, possible to employ more complicated shapes, e. g., ellipses, polygons of five or more sides, stars, and shapes combining curves and straight lines, although these more complicated shapes are costly and difficult to produce and yet do not offer any known advantages over the simpler shapes shown in Figures 3, 4, and 5.

Each of the projections of Figures 3, 4, and 5 has an upper surface 12 which is joined to the root surface 10 of the screw by one or more side walls 13. Upper surface 12 and root surface 10 are parallel surfaces in the preferred embodiment of this invention, the parallel relationship being preferred merely because of the ease of fabricating the projections in that manner. Surfaces 12 might be non-parallel with root surface 10, or they might be flat, concave, pyramidal and still be operable within the scope of this invention as long as a relatively sharp corner is formed along the leading edge or edges of the projection by the junction of upper surface 12 with side wall 13. The simplest arrangement, which is entirely satisfactory from an operational point of view, is that in which side wall 13 forms a right angle at its junctions with upper surface 12 and with root surface 10. A sharper angle could be formed by sloping walls 13 inwardly from upper surface 12 to root surface 10, thus forming acute angles at the junctions of adjacent surfaces.

In order to attain proper functioning of the screw extrusion device of this invention, the projections 9 must not extend too far away from root surface 10. In general, the deeper is the screw thread 11 (or, in other words, the greater is the difference between the outside diameter of screw thread 11 and the diameter of root surface 10) the more the projections 9 may extend above root surface 10. The amount the projection extends above root surface 10 is the height of side walls 13, and this height should be not less than about 0.03 inch and not more than about 20% of the depth of the screw thread. The minimum height should not be less than the particle size of the plastic being fed to the extrusion apparatus. A projection height of 0.0625 inch has been succesfully used on a screw having an outside diameter of 2.0 inches and a root diameter of 1.1 inches, and also upon a screw having an outside diameter of 4.5 inches and a root diameter of 2.9 inches. Calculation of these two cases will indicate that the projection height was approximately 14% of the thread depth in the first case, and approximately 8% in the second case.

The total surface area of the projections (ref. 12 in Figures 3, 4, and 5) has been found to be an important variable, and it is best described with relationship to the area of root surface 10. Preferably, the total area of all surfaces 12 should be one-fifth to one-third of the total root surface area exclusive of surfaces 12. The root surface area 10 is meant to include only that area which is generally cylindrical and forms the base of the extrusion screw, and does not include any of the surfaces of the screw thread which extend outwardly from the root surface.

The device of this invention has been employed successfully in a counter-rotating, non-intermeshing twin-screw extruder, comprising a feed section, a metering section, an extraction section, and an extrusion section, and receiving as a feed material an aqueous dispersion of plasticized polyvinyl butyral. The feed hopper of the twin-screw extruder was fitted with a vertical sieve which removed some of the water from the plastic material before it contacted the screw. The aqueous dispersion entering the sieve device contained about 10% plastic solids and 90% water. The sieve removed sufficient water to reduce the concentration of water to about 30%–70% at the entrance to the extruder. The feed section of the twin-screw extruder was approximately 18 inches long, each of the screws having an outside diameter of 1.987 inches and a root diameter of 1.387 inches, the thread constituting a single flight with a constant pitch of 2.0 inches and a thread thickness of 0.25 inch. The root surface between adjacent screw flights was studded with diamond-shaped projections, formed by machining 4 equally spaced grooves 0.25 inch wide and 0.0625 inch deep parallel to the screw thread, and 4 similar grooves with the opposite hand thread. The resulting diamond-shaped projections, having two opposing angles of 45° each, and two other opposing angles of 135° each, cover an area which is approximately one-third of the area of the grooves. The barrel surrounding the feed section was rifled with helical grooves $\frac{1}{8}$ inch wide and $\frac{1}{16}$ inch deep having a lead of 2 inches and a pitch of 0.33 inch.

This apparatus provided a consistently high throughput delivering molten polyvinyl butyral containing 1%–2% water content with negligible variations in homogeneity of the molten product, in the water content, and in the production rate. In contrast, the same apparatus, having no projections on the root surface, provided an erratic and unpredictable throughput rate, variations in the water content of the product, and inhomogeneities in the molten extrudate. Such differences in operational control are not subject to numerical values but those differences define an unacceptable process on the one hand, and an acceptable commercial process on the other hand.

It is apparent that the apparatus of this invention has many useful embodiments. Projections of various sizes and shapes may be used on a single extrusion screw, which, in turn, may have either a constant or a variable root diameter. Single-flighted or multi-flighted screws may employ this invention. The metering section, the extractor section, or the extrusion section of a screw extruder may be provided with the projections of this invention to maintain proper frictional forces between the screw and the plastic. Many other embodiments will be apparent to those skilled in the art, and, therefore, this invention is intended to be limited only to the extent specified in the appended claims.

We claim:

1. In an extrusion apparatus, the improvement which comprises a multiplicity of small, sharp-edged projections located on, and extending outwardly from, the root surface of an extrusion screw, the height of each of said projections above the said root surface being from 0.03 inch to 20% of the depth of the thread of said extrusion screw, the total area of the outwardly exposed surfaces of said projections amounting to one-fifth to one-third of the root surface area between projections.

2. The apparatus of claim 1 in which the feed section of the extrusion screw is provided with said projections.

3. The apparatus of claim 1 in which the shape of said outwardly exposed surfaces of said projections is a quadrangle.

References Cited in the file of this patent

UNITED STATES PATENTS 2,620,752    Braibanti _____ Dec. 9, 1952